United States Patent [19]

Hadavi et al.

[11] Patent Number: 4,956,784
[45] Date of Patent: Sep. 11, 1990

[54] APPARATUS AND A METHOD FOR CONTROLLING THE RELEASE OF JOBS FROM A POOL OF PENDING JOBS INTO A FACTORY

[75] Inventors: Khosrow Hadavi, Pennington; Maryam S. Shahraray, Freehold, both of N.J.

[73] Assignee: Siemens Coporate Research, Inc., Princeton, N.J.

[21] Appl. No.: 284,165

[22] Filed: Dec. 14, 1988

[51] Int. Cl.$^5$ .............................................. G06F 15/00
[52] U.S. Cl. .................................... 364/468; 364/403
[58] Field of Search ................. 364/403, 401, 468, 478

[56] References Cited

PUBLICATIONS

Glassey et al.; Closed Loop Job Release Control for VLSI Circuit Manfacturing; IEEE Trans. on Semiconductor Manufacturing; vol. 1, No. 1; Feb. 1988; pp. 36–46.
Bechte; Controlling Manufacturing Lead Time and Work in Progress Inventory by Means of Load-Oriented Order Release; Amer. Prod. & Inv. Cntrl. Soc.; 1982 Conference Proceedings; pp. 67–72.
Irastorza et al.; A Loading and Balancing Methodology for Job Shop Control; AIIE Trans., vol. 6, no. 4; Dec. 1974; pp. 302–307.

Primary Examiner—Allen MacDonald
Attorney, Agent, or Firm—Adel A. Ahmed

[57] ABSTRACT

A method is disclosed for controlling the release of jobs from a pool of pending jobs into a factory, which includes a plurality of machines processing jobs-in-progress, which comprises the following steps. First, a continuity index (CI) is calculated for one of the jobs in the job pool, which is related to the total amount of processing time required by that job, and the antipicated time to finish that job. Second, a mean continuity index (MCI) is calculated related to the CI of all of the jobs processed by the factory in a predetermined period of time. Third, a lower range ($r_1$) and an upper range ($r_2$) are calculated which are releated to the utilization factor of the machines and the fraction of jobs which are on time. Finally, a job is released from job pool into said factory if:

$$MCI - r_1 \leq CI \leq MCI + r_2$$

otherwise, the steps are repeated for the other jobs remaining in the job pool.

18 Claims, 3 Drawing Sheets

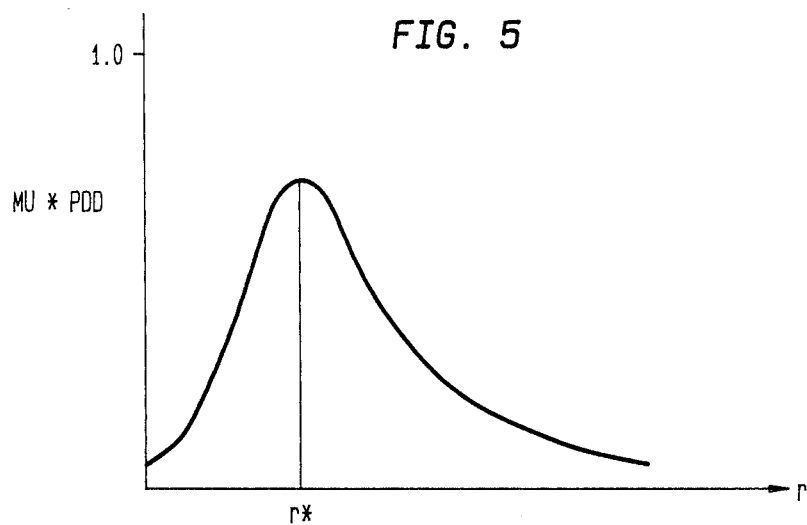

APPARATUS AND A METHOD FOR CONTROLLING THE RELEASE OF JOBS FROM A POOL OF PENDING JOBS INTO A FACTORY

The present invention relates to apparatus and a method for controlling the release of orders into a factory, such as, for example, a job-shop or a flow-shop type of factory.

Shop floor scheduling is an important task in managing a production system. Various, sometimes conflicting, objectives must be considered, for example: maximizing throughput; minimizing the average time orders spend in the factory, which reduces the amount of work-in-progress (WIP); maximizing the number of delivery dates met; maintaining inventory at a reasonable level; and maximizing the utilization of the resources. One aspect of shop floor scheduling is controlling the release of pending jobs onto the shop floor. This aspect is called lot release. Another aspect of shop floor scheduling is controlling jobs already on the shop floor. This aspect is called lot dispatching, and is concerned with which lot of WIP is to be processed next when a machine becomes available.

While much research has been performed in lot dispatching, the control rules developed have generally assumed that the release of jobs to the shop floor has been random, commonly, a Poisson random process. There are, however, other approaches to lot release.

One such approach is called uniform starting interval. The uniform starting interval approach releases jobs onto the shop floor at fixed intervals. Throughput of the factory is controlled by varying the interval between the release of jobs. Another approach is called work load regulation. The work load regulation approach monitors the sum of the remaining processing time at the bottleneck resources for all jobs in the shop. When this sum falls below a critical value, a new job is released onto the shop floor. Throughput may be controlled by changing the critical value. A third approach is called fixed WIP. The fixed WIP approach maintains the number of jobs in the system to be constant. A new job is released whenever a finished job leaves the shop floor. Throughput is controlled by adjusting the constant WIP level.

In the article, "Closed-Loop Job Release Control for VLSI Circuit Manufacturing," by C. R. Glassey et al., published in the IEEE Transactions on Semiconductor Manufacturing, vol. 1, no. 1, 1988, pages 36–46, it is suggested that lot release control pays a more significant role than lot dispatching in terms of effective shop floor scheduling. In addition, more and more factories are using computers to aid in shop floor scheduling. Thus, an effective lot release method, which may be implemented on a computer system, if required, is desirable, in order to increase the efficiency of shop floor schedules.

In accordance with principles of the present invention, a method for controlling the release of jobs from a pool of pending jobs into a factory, which includes a plurality of machines processing jobs-in-progress in response to management objectives, comprises the following steps. First, calculate a continuity index (CI) for one of the jobs in the job pool, which is related to the total amount of processing time required by that job, and the anticipated time to finish that job. Second, calculate a mean continuity index (MCI) related to an operational parameter of the factory. Third, calculate a lower range ($r_1$) and an upper range ($r_2$) related to the management objectives. Finally, release the job in the job pool into the factory if:

$$MCI - r_1 \leq CI \leq MCI + r_2.$$

In the drawing:

FIG. 5 is a diagram illustrating the relationship of the product of machine utilization and number of jobs on time to the range of acceptable continuity indices.

Figure 1:
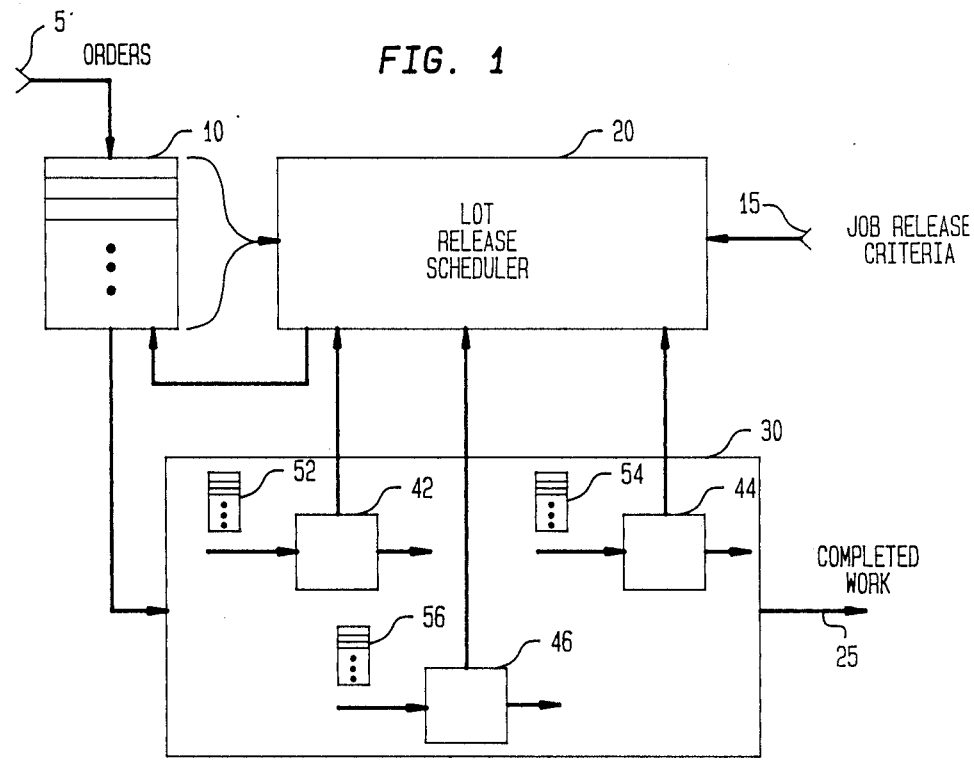
FIG. 1 is a block diagram of a factory implementing the job release method according to the present invention.

FIG. 1 is a block diagram representing a factory, such as a job-shop, in which jobs are allocated to machines in random order; or a flow shop, in which jobs are allocated to machines in the same order for each lot of WIP. In FIG. 1, orders received from customers (not shown) are represented by an input terminal 5. The orders received are saved in a job pool 10. Information about all of the orders in job pool 10 is supplied to a lot release scheduler 20. The lot release scheduler 20 controls which of the available pending jobs in job pool 10 is next to be released into the factory. The released order is supplied to the shop floor 30. Shop floor 30 includes a plurality of machines, represented in FIG. 1 by machines 42, 44 and 46, which are processing jobs-in-progress. (The shop floor may, of course, include more than the three machines illustrated in FIG. 1.) Individual lots of WIP are routed among the machines by known lot dispatching methods. Completed work leaves the shop floor, as indicated by output terminal 25. This work may be sent to a shipping dock (not shown) whence it will be shipped to the ordering customer.

During the lot dispatching, certain machines may develop waiting queues in front of them. These machines may be deemed bottlenecks. It has been found that the throughput of a factory is limited by such bottlenecks. The waiting queues for the illustrated machines 42, 44 and 46 are represented by the lists 52, 54 and 56, respectively. The state of the queues may be reported to the lot release scheduler 20 by the machines 42 to 46. (Other information may also be reported to the lot release scheduler 20 from the machines 42 to 46, such as whether the machine is currently inoperative or when it is to be shut down for preventative maintenance.) In addition, job release criteria, from, for example, management personnel (not shown), represented by input terminal 15, are supplied to the lot release scheduler 20.

Figure 2:
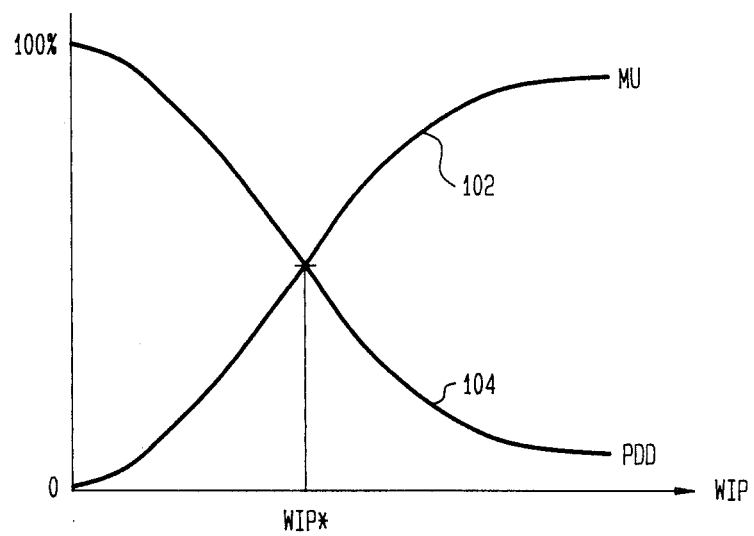
FIG. 2 is a diagram illustrating the relationship of machine utilization and number of jobs on time to the amount of WIP in a factory.

Management criteria may, for example, include machine utilization and job on-time objectives. FIG. 2 illustrates the relationships of the percentage of machine utilization (MU) and percentage of orders on-time in meeting their due dates (PDD) to the amount of WIP. When there is a relatively small amount of WIP, represented in the left-hand portion of the Figure, then the percentage of jobs meeting their due dates (PDD) is high, but the machine utilization (MU) will be small. On the other hand, when there is a relatively large amount of WIP, represented in the right-hand portion of the Figure, then machine utilization (MU) is nearly full, but the percentage of jobs meeting their due dates (PDD) is very low because of the overloaded shop floor conditions. There is an optimal amount of WIP, designated as WIP*, for which optimal performance, in terms of MU and PDD, is obtained. In FIG. 2, this optimal amount of WIP is illustrated as being at the intersection of the two curves representing MU and PDD, respectively. This optimal amount of WIP may, however, be at some other location, depending upon management objectives.

In operation, the lot release scheduler 20 analyses the information supplied to it, according to the method of the present invention, and either releases a job which will most likely result in fulfilling the management objectives or does not release any job. The method of the present invention emphasizes the notion that no job should be released to the shop floor 30 unless there is a good chance of being processed while on the shop floor 30. This involves forecasting future events. Discrete simulation may be used to provide such forecasting, however, simulation is time-consuming and expensive. Instead of such simulations, the present invention provides a quick answer to the question of whether a particular job should be released to the shop floor 30.

To provide this answer, an index, called herein a continuity index an designated CI, is calculated for each pending job in the job pool 10. The CI for a particular job in the job pool 10 measures how continuously the order would actually be processed if that job were to be released to the shop floor 30 at that time. The CI is determined by the following steps.

First, the job is analyzed by the lot release scheduler 20 to estimate the total amount of actual processing time would be required by the job. Second, the lot release scheduler 20 determines which machines (e.g. 42 to 46) would be required to perform processing on the job, the order of processing, and approximately when that job would be available to the machines. The information from the queues 52 to 56 of the machines 42 to 46, respectively, is also supplied to the lot release scheduler 20. This allows the lot release scheduler 20 to estimate the amount of time that the job being analyzed would spend waiting for the machines which would process it. From this information, the anticipated time which would be required to complete the job is estimated. This estimated time includes both processing time and time spent waiting in the queues (e.g. 52 to 56) of the machines (e.g. 42 to 46, respectively). The CI is then calculated as the ratio:

$$CI = \frac{\text{Total processing time}}{\text{Total time to complete}} \quad (1)$$

If this ratio is small, then an anticipated relatively large amount of time will be spent waiting in machine queues, indicating that the machine utilization is high, but that the factory may be overloaded and more job due dates may be missed. As this ratio grows larger, the job will spend less time waiting, indicating that job due dates are more likely to be met, but that machine utilization is lower. If this ratio is within an acceptable range, then the lot release scheduler 20 releases the order onto the shop floor 30. The continuity index may, therefore, be thought of as a measurement of WIP as represented on FIG. 2.

The job release criteria from management at input terminal 15, and operation of the factory in general, controls what is an acceptable range for CI. Continuing the above example, management objectives may be expressed in terms of machine utilization and due date requirements. Given this information, a range of CI may be calculated and pending jobs whose CI is within this range will be released onto the shop floor 30, while those whose CI is not within this range will be retained in the job pool 10. Alternatively, if optimal values of machine utilization and percentage of on-time orders are required, then the range of acceptable CIs may be dynamically updated based, for example, on historical performance data.

Figure 3:
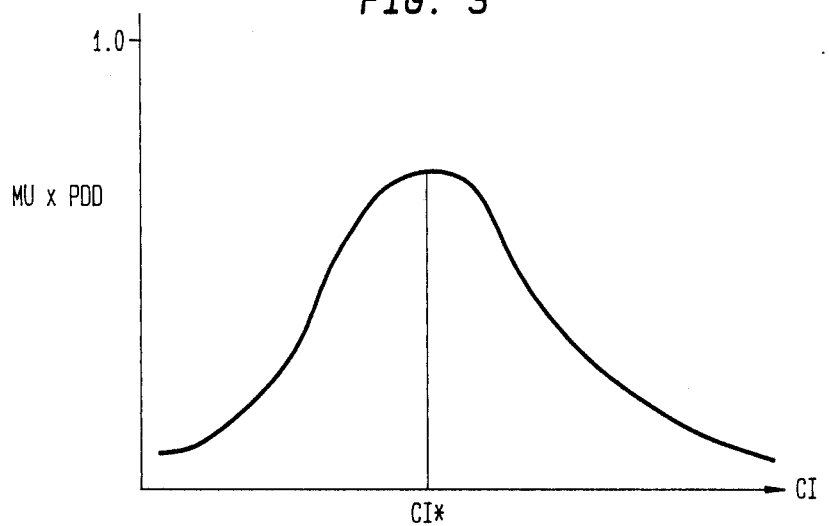
FIG. 3 is a diagram illustrating the relationship of the product of machine utilization and number of jobs on time to the continuity index, calculated according to the method of the invention.

A curve for a factory, relating an operational parameter, such as the machine utilization and percentage of jobs meeting their due dates, to the continuity index, designated a characteristic curve, may be developed. FIG. 3 illustrates such a curve. FIG. 3, shows the relationship of the product of MU×PDD to the CI. The shape of the curve may be deduced from FIG. 2 because CI is representative of the amount of WIP, as described above. There is an optimum CI, designated CI*, for which the product MU×PDD is maximized. It is obvious that the average CI for all jobs should be CI*, in order to optimize the management objectives.

Each job released by the lot release scheduler 20 should contribute to the average CI in a way that is consistent with management objectives. Further it should be noted that the shape of the factory characteristic curve indicates the sensitivity of the factory to changing CI. A curve with a flatter peak indicates that a wider range of WIP (or CI) will yield optimal objectives, and that a good job mix may be achieved. A curve with a sharper peak is a sign of a sensitive environment, and may indicate the presence of critical and/or bottleneck machines.

Figure 4:
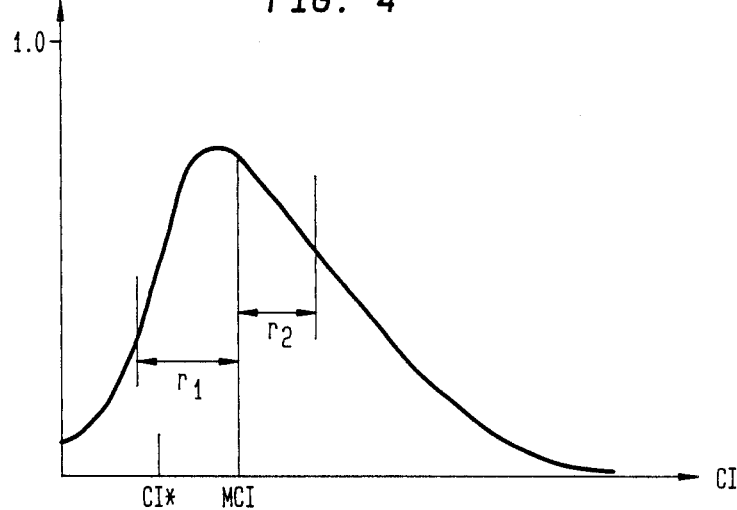
FIG. 4 is a diagram illustrating the time distribution of the continuity index over a range of jobs normally processed by the factory over a predetermined period of time.

In order to determine a range of CI which will allow management objectives to be met, the distribution of CIs for all jobs processed by the factory over a predetermined period of time is calculated. In this way a time distribution of CI may be derived. FIG. 4 represents a distribution of the CIs of all of the jobs processed by the factory over a predetermined period of time according to a predetermined set of management objectives. The CI of each job processed by the factory is accumulated over the course of a relatively long period of time. The percentage of jobs having that CI is then plotted in FIG. 4. This results in a time distribution curve of CIs of jobs processed by the factory. These data may be gathered either empirically by observing the factory in operation, or may be simulated (which, in this case would be a one-time simulation, and would not have to be repeated when each decision to release a job is made.) From FIG. 4, it can be seen that there is a mean CI, designated MCI for all jobs processed by the factory. The mean CI may be determined by the following equation:

$$MCI = \frac{\text{SUM } CI}{N} \quad (2)$$

where N is the total number of jobs processed by the factory in the predetermined period of time. This mean CI (MCI) is not necessarily the same as the optimal CI, CI*.

A lower range $r_1$ and an upper range $r_2$, surrounding MCI, may be expressed as a number of standard deviations from the MCI. This lower range ($r_1$) and upper range ($r_2$), which form acceptable CIs for jobs to be released onto the shop floor 30, may be also determined by empirical observation or simulation. It should be understood that $r_1$ could equal $r_2$ and be designated r.

FIG. 5 shows the relationship of the product of MU×PDD to the range r around MCI. As the range gets smaller (i.e. fewer standard deviations from MCI), fewer jobs are released into the system. This leads to a larger percentage of jobs meeting their due dates, but lower machine utilization. As the range gets larger (i.e. more standard deviations from MCI), more jobs are released into the system. This leads to higher machine utilization but a smaller percentage of jobs meeting their due dates. As is shown in FIG. 5, there is an optimal range r, designated r*, which will maximize the product of MU×PDD. The curve of r versus MU×PDD may be derived from empirical observation, or from simulation. In general terms, optimal values of the lower range $r_1$ and upper range $r_2$ may also be determined, and designated $r_1^*$ and $r_2^*$, respectively.

Thus, in order to determine whether a job from the job pool 10 is to be released onto the shop floor 30, the following comparison is made:

$$MCI - r_1^* \leq CI \leq MCI + r_2^* \qquad (3)$$

for all jobs in the job pool 10. Any job whose CI satisfies this comparison may be released onto the shop floor 30.

Experimental evidence, based upon simulations, indicates that the use of a lot release scheduler operating in accordance with principles of the present invention leads to the following advantages. First, the last job will be released from the factory at the same time as in a factory not using the present invention. In a factory not using the present invention, the average time for an order to be completed increases linearly, or possibly exponentially, with the number of jobs-in-progress. Using the present invention, this time is bounded and approaches a constant value. In a factory not using the present invention, the product of MU×PDD drops very quickly to zero as soon as too many jobs are released. Using the present invention, the product of MU×PDD (with moving due dates) is maintained constantly at an optimal level regardless of the number of jobs-in-progress.

In a factory not using the present invention, the product of MU×PDD (with fixed due dates) drops in the same manner as for moving due dates. Using the present invention, the product MU×PDD drops at a much slower rate. In a factory not using the present invention, the total lateness and average lateness increases exponentially with the number of jobs-in-progress. Using the present invention, the total lateness and average lateness is almost zero. In a factory not using the present invention, the WIP cost can increase exponentially with the number of jobs-in-progress. Using the present invention, the WIP cost is kept constant, regardless of job arrivals. Finally, in a factory not using the present invention, the total cost (WIP, machine idle time, and due date missed) increases exponentially with the number of jobs-in-progress. Using the present invention, this cost drops substantially.

It should be noted that the CIs, and the MCI for the jobs calculated in equations (1) and (2) and comparison (3) may be calculated for a predetermined period of time, designated T. For example, a period of one day may be used. In this case the CI is a measure of how continuously the order would actually be processed during that day, if that job were to be released to the shop floor 30 at that time. The ratio leading to the CI is then modified to be:

$$CI = \frac{\text{Total processing time within } T}{\text{MIN (Total time to complete, } T)} \qquad (4)$$

where the denominator represents the smaller of either the total time to complete the job, or the predetermined amount of time over which CI is being calculated. The mean CI (MCI) and range r are calculated in the same manner as above but based on the CI calculated in equation (4).

It is apparent from the above that MCI and r are dependent upon the operation of the factory and management objectives. So long as these remain constant, these parameters need not be recalculated. In such a case, when the pending jobs in the job pool 10 are evaluated for possible release onto the shop floor 30, only the CI for those jobs need be calculated. If one or more of the jobs meets the criterion of comparison (3), then they are released onto the shop floor 30. It is also apparent, however, that the parameters MCI and r may be determined by empirical observation. If these parameters are so determined, then they may be continually updated based upon the current operation of the factory and the current management objectives. These parameters may also be updated at any desired time.

It should be understood that the lot release scheduler 20 may be a computer system, either central or distributed. Furthermore, the job pool 10 may be implemented in computer form as a data base of information relating to the orders. This data base may reside on the same computer as that of the lot release scheduler 20, or may exist on a different computer. The job pool 10 computer, if separate from the lot release scheduler 20 computer, may be directly linked to the lot release scheduler 20 computer. It should be further understood that the machines 42 to 46 on the shop floor 30, may be computer controlled or computer monitored. The controlling or monitoring computer or computers may be connected directly to the lot release scheduler 20 computer.

What we claim is:

1. A method for controlling the release of jobs from a pool of pending jobs into a factory including a plurality of machines processing jobs-in-progress, said method comprising the steps of:

providing a job release scheduler for controlling release of a job from the pool of pending jobs into the factory, said job release scheduler having inputs connected to the machines and other components of the factory relating to an amount of time required to process a job in the factory and an amount of time anticipated to complete the job within the factory including waiting time at the machines;

calculating a continuity index (CI) for one of the jobs in said pool of pending jobs, said continuity index being related to the total amount of processing time required by said one of said pending jobs, and the anticipated time to complete said one of said pending jobs;

calculating a mean continuity index (MCI) related to an operational parameter of said factory according to management objectives for processing and completing a job in said factory;

calculating a lower range (r1) and an upper range (r2) related to said management objectives; and operating said job release scheduler for releasing said one of said jobs into said factory if:

$$MCI - r1 < CI < MCI + r2.$$

2. The method of claim 1, wherein said continuity index calculating step comprises the step of calculating the mathematical formula:

$$CI = \frac{\text{Total processing time}}{\text{Total time to complete}}.$$

3. The method of claim 1, wherein said mean continuity index calculating step comprises the steps of:
calculating the time distribution of the continuity indices of all jobs processed by said factory in a predetermined period of time; and
using the mean of said time distribution as said mean continuity index.

4. The method of claim 3, wherein said mean continuity index MCI is calculated by the mathematical formula:

$$MCI = \frac{\text{SUM } CI}{N}$$

where N is the number of jobs-in-progress processed by said factory in said predetermined period of time.

5. The method of claim 1, wherein said range calculating step comprises the steps of:
calculating the relationship of said management objectives to different range (r) values;
selecting as said range (r) the value (r*) which results in maximizing the management objectives.

6. The method of claim 1, wherein:
said mean continuity index calculating and said range calculating steps are performed once; and
said continuity index calculating and job releasing steps are performed repeatedly whenever it is desired to make a decision to release a job into said factory.

7. The method of claim 1, wherein said mean continuity index calculating step is performed whenever said operational parameter of said factory changes substantially.

8. The method of claim 1, wherein said range calculating step is performed whenever said management objectives change substantially.

9. Apparatus for controlling the release of jobs from a pool of pending jobs into a factory including a plurality of machines processing jobs-in-progress, comprising:
a job release scheduler for controlling release of a job from the pool of pending jobs into the factory, said job release scheduler having inputs connected to the machines and other components of the factory relating to an amount of time required to process a job in the factory and an amount of time anticipated to complete the job within the factory including waiting time at the machines;
means for calculating a continuity index (CI) for one of the jobs in said pool of pending jobs, said continuity index being related to the total amount of processing time required by said one of said pending jobs, and the anticipated time to complete said one of said pending jobs;
means for calculating a mean continuity index (MCI) related to an operational parameter of said factory according to management objectives for processing and completing a job in said factory;
means for calculating a lower range (r1) and an upper range (r2) related to said management objectives; and
means for operating said job release scheduler for releasing said one of said jobs into said factory if:

$$MCI - r1 < CI < MCI + r2.$$

10. The apparatus of claim 9, wherein said continuity index calculating means comprises means for calculating the mathematical formula:

$$CI = \frac{\text{Total processing time}}{\text{Total time to complete}}.$$

11. The apparatus of claim 9, wherein said mean continuity index calculating means comprises:
means for calculating the time distribution of the continuity indices of all jobs processed by said factory in a predetermined period of time; and
means for using the mean of said time distribution as said mean continuity index.

12. The apparatus of claim 9, wherein said mean continuity index calculating means comprises means for calculating the mathematical formula:

$$MCI = \frac{\text{SUM } CI}{N}$$

where N is the number of jobs-in-progress processed by said factory in said predetermined period of time.

13. The apparatus of claim 9, wherein said range calculating means comprises:
means for calculating the relationship of said management objectives to different range (r) values;
means for selecting as said range (r) the value which results in maximizing the management objectives.

14. A factory for processing jobs-in-progress, and producing completed work, said factory comprising:
a plurality of machines, at least one of which includes a waiting queue of jobs to be processed thereat, said at least one machine providing status information relating to its respective waiting queue;
a source of jobs in a pool to be processed in the factory, and job storing means for storing the pool of pending jobs to be processed;
a job release scheduler for controlling release of jobs from the pool of pending jobs into the factory, said job release scheduler receiving said waiting queue status information from said at least one machine in order to determine amounts of time required to process jobs in the factory and amounts of time anticipated to complete jobs within the factory including waiting time at the machines;
means for calculating continuity indexes (CI) for the jobs in said pool of pending jobs, said continuity indexes being related to the amount of processing time required by the pending jobs, and the anticipated time to complete the pending jobs;
means for producing selection information for selecting an order of jobs to be released into the factory;

means for providing job release criteria according to management objectives for processing and completing jobs in said factory, including a mean continuity index (MCI) related to an operational job release parameter of said factory and a lower range (r1) and an upper range (r2) for said mean continuity index; and means, responsive to said machine waiting queue status information, said job storing means, said means for calculating continuity indexes, said means for producing selection information, and said means for providing job release criteria, for operating said job release scheduler for releasing said pending jobs into said factory when said continuity indexes (CI) satisfy the following relation:

$$MCI - r1 < CI < MCI + r2.$$

15. The factory of claim 14, wherein said selection information producing means comprises a computer.

16. The factory of claim 14, wherein said order storing means comprises a data base stored on a computer.

17. The factory of claim 14, wherein said selection information producing means and said order storing means are comprised on the same computer.

18. The factory of claim 14, wherein said machines are controlled by a computer system directly connected to said information producing means and order storing means computer.

* * * * *